(12) United States Patent
Krohn et al.

(10) Patent No.: US 6,739,858 B2
(45) Date of Patent: May 25, 2004

(54) INSULATED APPARATUS FOR INJECTING AND REMOVING COMPRESSED AIR FROM A COOLED MOLD CAVITY

(75) Inventors: Roy Krohn, York, PA (US); Gregory Duane Taylor, York, PA (US)

(73) Assignee: Graham Packaging Company, L.P., York, PA (US)

(*) Notice: Subject to any disclaimer, the term of this patent is extended or adjusted under 35 U.S.C. 154(b) by 30 days.

(21) Appl. No.: 10/230,081

(22) Filed: Aug. 29, 2002

(65) Prior Publication Data

US 2004/0043099 A1 Mar. 4, 2004

(51) Int. Cl.⁷ ............................ B29C 49/60; B29C 45/17
(52) U.S. Cl. ..................... 425/130; 264/572; 425/536
(58) Field of Search ................................ 425/130, 536; 264/572

(56) References Cited

U.S. PATENT DOCUMENTS

| | | | | |
|---|---|---|---|---|
| 3,338,998 A | * | 8/1967 | Settembrini | 425/536 |
| 3,513,502 A | * | 5/1970 | Chambers | 425/536 |
| 3,767,350 A | * | 10/1973 | Horberg et al. | 425/536 |
| 3,870,452 A | * | 3/1975 | Frank | 425/535 |
| 3,895,897 A | * | 7/1975 | Hudson | 425/536 |
| 3,932,084 A | * | 1/1976 | Reilly | 425/536 |
| 3,973,896 A | * | 8/1976 | Peters | 425/536 |
| 4,859,397 A | * | 8/1989 | Peters | 425/536 |
| 4,946,366 A | * | 8/1990 | Dundas et al. | 425/536 |
| 4,990,083 A | * | 2/1991 | Bernhardt | 264/572 |
| 5,049,056 A | * | 9/1991 | Baxi et al. | 425/130 |
| 5,198,238 A | * | 3/1993 | Baxi | 425/130 |
| 5,364,252 A | * | 11/1994 | Hlavaty et al. | 425/536 |
| 5,795,533 A | * | 8/1998 | Mehnert | 425/536 |

FOREIGN PATENT DOCUMENTS

| | | | | |
|---|---|---|---|---|
| DE | 19713874 A1 | * | 10/1998 | B29C/49/60 |
| JP | 09076275 A | * | 3/1997 | B29C/49/60 |

* cited by examiner

*Primary Examiner*—Robert Bartley Davis
(74) *Attorney, Agent, or Firm*—Venable LLP; James R. Burdett; Keith G. Haddaway

(57) ABSTRACT

An apparatus, mounted to a mold, for injecting air into a mold cavity and removing exhaust from the mold cavity, comprising: a blow cylinder body block mounted to the mold having a conduit to the mold cavity, wherein the blow cylinder body block comprises an insulator and the conduit has walls; a needle passing through the blow cylinder body block and the conduit, wherein the needle is connected to a piston, wherein the needle has a needle passage, and wherein compressed air is applied to the piston to extend the needle into the mold cavity and retract the needle from the mold cavity; and an insulator between the needle and the conduit walls.

30 Claims, 4 Drawing Sheets

INSULATED APPARATUS FOR INJECTING AND REMOVING COMPRESSED AIR FROM A COOLED MOLD CAVITY

BACKGROUND OF THE INVENTION

1. Field of the Invention

The present invention relates to an air injection and removal system. More specifically, the present invention relates to an insulated apparatus for injecting and removing compressed air from a cooled mold cavity.

2. Background of the Invention

Blow-molded plastic containers have become commonplace in packaging beverages, such as juice, and other hot and cold liquid products. Such a container normally has a dome, an annular sidewall extending from a base, and a waist connecting the dome to the sidewall. Typically, the containers have a horizontal cross section which is circular, rectangular or multi-faceted. Blow-molded plastic containers can provide a package with sufficient flexure to compensate for pressure and temperature, while maintaining structural integrity and aesthetic appearance. In addition, the plastic used in the containers is recyclable.

In a blow-molding process, a parison is inserted into the mold cavity, a needle is inserted into the parison, and the container is blown. In order to keep the mold cool to cool the mold cavity, the mold has passages filled with chilled water. During the blow-molding process, polymer volatiles are generated, and these polymer volatiles need to be vented. If the blow cylinder body block and the needle are not kept at a temperature that is higher than the mold, the polymer volatiles will condense on the needle and the passage inside the needle. Therefore, there is a need for an apparatus to keep the blow cylinder body block and the needle at a higher temperature than the mold to avoid premature condensing of polymer volatiles exhausting through the needle.

BRIEF SUMMARY OF THE INVENTION

According to a first embodiment, an apparatus, mounted to a mold, for injecting air into a mold cavity and removing exhaust from the mold cavity, comprises a blow cylinder body block mounted to the mold having a conduit to the mold cavity, wherein the blow cylinder body block comprises a first insulator and the conduit has walls; a needle passing through the blow cylinder body block and the conduit, wherein the needle is connected to a piston, wherein the needle has a needle passage, and wherein compressed air is applied to the piston to extend the needle into the mold cavity and retract the needle from the mold cavity; and a second insulator between the needle and the conduit walls. The first insulator may comprise Delrin®. The second insulator may be air. The apparatus further comprises a plurality of O-rings surrounding the needle to seal off air flow and exhaust. The apparatus further comprises a groove surrounding the needle in the blow cylinder body block. The apparatus further comprises a cylinder block; and a endcap, wherein the endcap, cylinder block and blow cylinder body block form a housing in which the piston is housed. The cylinder block and end cap comprise aluminum. The apparatus further comprises a first fitting connected to the housing through the endcap; a second fitting connected to the housing through the blow cylinder body block; and a third fitting passing through the blow cylinder body block and connected by an air passage to the needle. The first, second, and third fittings are coupled to a pneumatic drive for supplying compressed air to the first, second, and third fittings.

According to a second embodiment an apparatus, mounted to a mold, for injecting air into a mold cavity and removing exhaust from the mold cavity, comprises a blow cylinder body block mounted to the mold having a conduit to the mold cavity, wherein the conduit has walls; a needle passing through the blow cylinder body block and the conduit, wherein the needle is connected to a piston, wherein the needle has a needle passage, and wherein compressed air is applied to the piston to extend the needle into the mold cavity and retract the needle from the mold cavity; and a first insulator forming a layer on the conduit walls. The apparatus further comprises a second insulator between the first insulator and the conduit walls, wherein the second insulator is air. The apparatus further comprises a plurality of O-rings surrounding the needle to seal off air flow and exhaust. In the second embodiment the blow cylinder body block comprises aluminum. The first insulator may comprise Delrin®. The apparatus further comprises a groove surrounding the needle in the blow cylinder body block. The apparatus further comprises a cylinder block; and a endcap, wherein the endcap, cylinder block and blow cylinder body block form a housing in which the piston is housed. The apparatus further comprises a first fitting connected to the housing through the endcap; a second fitting connected to the housing through the blow cylinder body block; and a third fitting passing through the blow cylinder body block and connected by an air passage to the needle. The first, second, and third fittings are coupled to a pneumatic drive for supplying compressed air to the first, second, and third fittings. In the second embodiment, the blow cylinder body block, cylinder block and endcap comprise aluminum. Alternatively, in a third embodiment, the blow cylinder body block comprises an insulator. The insulator may comprise Delrin®.

According to a fourth embodiment, an apparatus, mounted to a mold having a mounting surface, for injecting air into a mold cavity and removing exhaust from the mold cavity, comprises a spacer; a blow cylinder body block mounted to the mold through a spacer forming an air gap between the mounting surface and the blow cylinder body block, wherein the mold has a conduit to the mold cavity and wherein the conduit has walls; a needle passing through the body and the conduit, wherein the needle has a needle passage, and wherein compressed air is applied to the piston to extend the needle into the mold cavity and retract the needle from the mold cavity; and an insulator between the needle and the conduit walls. The insulator is air. The apparatus further comprises a plurality of O-rings surrounding the needle to seal off air flow and exhaust. The apparatus further comprises a groove surrounding the needle in the blow cylinder body block. The apparatus further comprises a cylinder block; and a endcap, wherein the endcap, cylinder block and blow cylinder body block form a housing in which the piston is housed. The apparatus further comprises a first fitting connected to the housing through the endcap; a second fitting connected to the housing through the blow cylinder body block; and a third fitting passing through the blow cylinder body block and connected by an air passage to the needle. The first, second, and third fittings are coupled to a pneumatic drive for supplying compressed air to the first, second, and third fittings. The blow cylinder body block, cylinder block, and end cap comprise aluminum. The air gap is at least 0.03 inches.

DETAILED DESCRIPTION OF THE INVENTION

Figure 1:
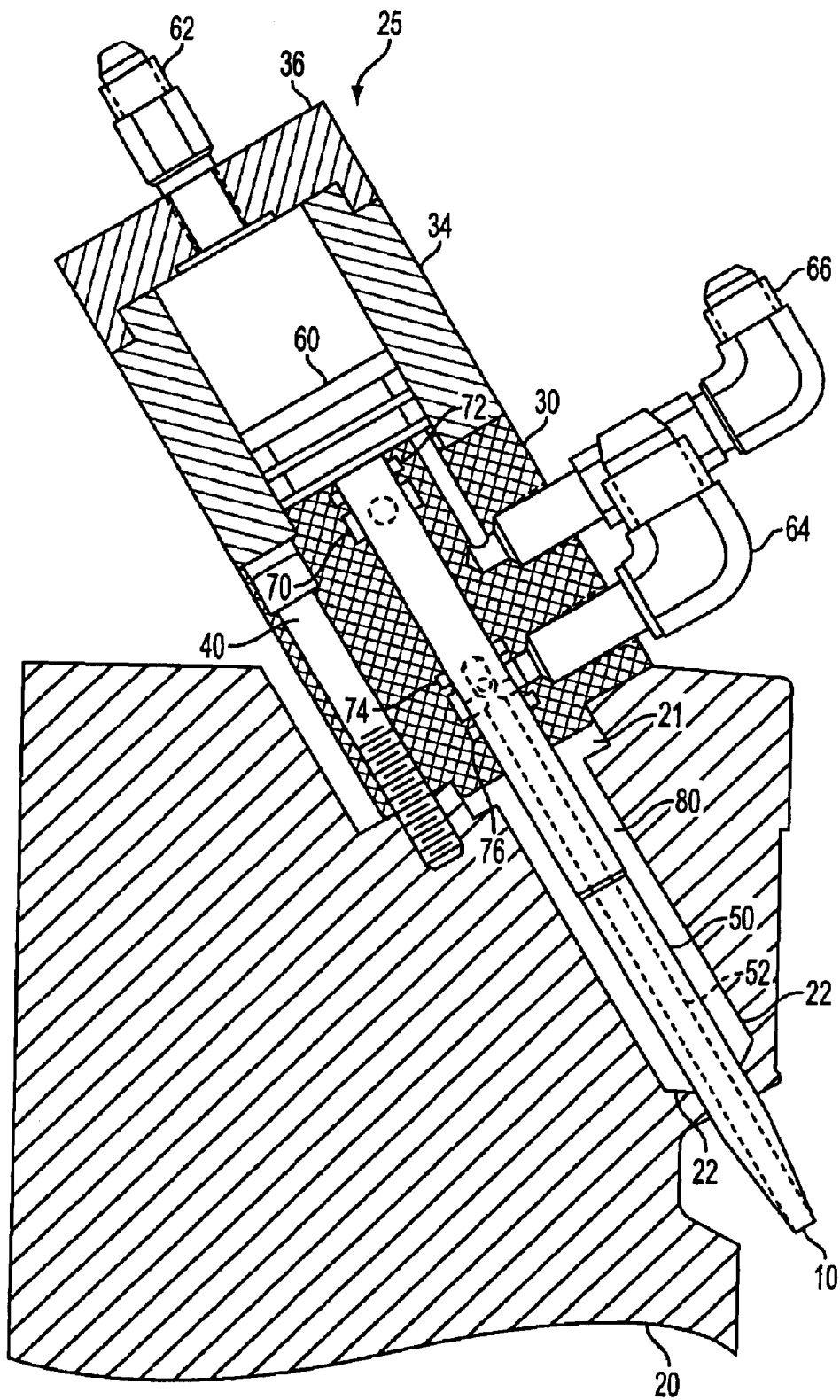
FIG. 1 is a cross section of an injection and exhaust removal system of a first embodiment of the present invention.

FIG. 1 shows a first preferred embodiment of an air injection and removal system for injecting and removing air from a mold cavity 10. A portion of the mold is identified by reference number 20. The mold 20 has a conduit 21, which extends from the mold cavity 10 to the air outside the mold cavity 10. The conduit has walls 22.

A needle block 25 is mounted to the mold 10 using screws 40. (For simplicity, only one screw is shown). The needle block 25 includes a blow cylinder body block 30, a cylinder block 34, and a endcap 36. Preferably, the cylinder block 34 and the endcap 36 are aluminum. The screws 40 pass through the blow cylinder body block 30 and into the mold 20 in order secure the blow cylinder body block 30 to the mold 20. Preferably, there is no air gap between the blow cylinder body block 30 and the mold 20. A needle 50, connected to a piston 60, passes through the blow cylinder body block 30 and has a passage 52 shown by dotted lines in FIG. 1. A pneumatic drive can supply air to the fittings, 62, 64, and 66. The pneumatic drive is compressed air, which is directed to flow through the fittings 62, 64, and 66 preferably on a mechanical command to a valve, timed by the rotation of the blowmolding wheel (not shown). Compressed air supplied through fitting 62 pushes the piston 60 to the blow cylinder body block 30, which extends the needle 50 into the mold cavity 10. When the needle 50 is extended into the mold cavity 10 as shown in FIG. 1, the pneumatic drive stops the supply of compressed air through fitting 62. Compressed air, supplied through fitting 64, enters the mold cavity 10 by way of the needle passage 52.

After a predetermined time, the pneumatic drive stops supplying air through fitting 64. Subsequently, the pneumatic drive supplies compressed air to the fitting 66 to move the piston 60 away from the blow cylinder body block 30 and toward the endcap 36, so that the needle 50 is retracted from the mold cavity 10. Exhaust from the mold cavity 10 enters the conduit 21 and travels through the needle passage 52. In the retracted position, the needle passage 52 connects to a groove 70, which vents the exhaust from the needle block 25. The O-rings 72, 74, and 76 seal off air flow and exhaust as the needle 50 extends into the mold cavity 10 and retracts from the mold cavity 10.

An insulator 80, which is preferably air, fills the space between the walls 22 of the conduit and the needle 50, to prevent the cold temperature of the mold 20 from decreasing the temperature of the air delivered through the needle 50 to the mold cavity 10. In the first embodiment, the blow cylinder body block 30 preferably comprises an insulator (e.g., Delrin®), which also insulates the cool air delivered through the needle 50 to the mold cavity 10. Delrin® is an acetal resin. Delrin® is not a thermoconductor. Moreover, insulator 80 and the blow cylinder body block 30 isolate the needle 50, which carries the exhaust from the cold mold 20. This prevents the condensation of the polymer volatiles on the outside of the needle 50 and in the needle passage 52.

Figure 2:
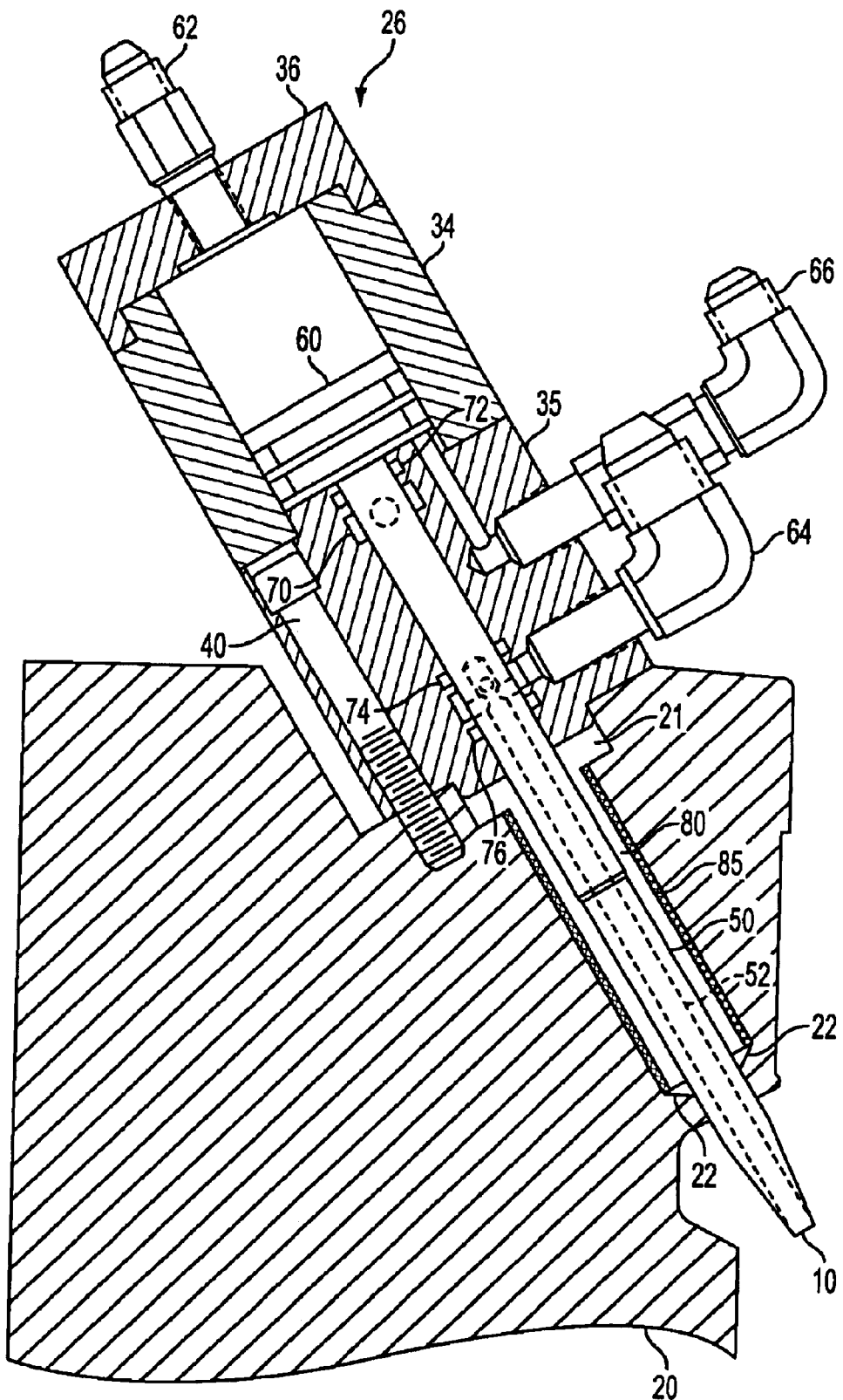
FIG. 2 is a cross section of an air injection and exhaust removal system of a second embodiment of the present invention.

FIG. 2 shows a second preferred embodiment of an air injection and removal system for injecting and removing air from a mold cavity 10. A portion of the mold is identified by reference number 20. The mold 20 has a conduit 21, which extends from the mold cavity 10 to the air outside the mold cavity 10. The conduit has walls 22.

A needle block 26 is mounted to the mold 10 using screws 40. (For simplicity, only one screw is shown). The needle block 26 includes a blow cylinder body block 35, a cylinder block 34, and a endcap 36. Preferably, the cylinder block 34, and the endcap 36 are aluminum. The screws 40 pass through the blow cylinder body block 35 and into the mold 20 in order secure the blow cylinder body block 35 to the mold 20. Preferably, there is no air gap between the blow cylinder body block 35 and the mold 20. A needle 50, connected to a piston 60, passes through the blow cylinder body block 35 and has a passage 52 shown by dotted lines in FIG. 2. A pneumatic drive can supply air to the fittings, 62, 64, and 66. The pneumatic drive is compressed air, which is directed to flow through the fittings 62, 64, and 66 preferably on a mechanical command to a valve, timed by the rotation of the blowmolding wheel (not shown). Compressed air supplied through fitting 62 pushes the piston 60 to the blow cylinder body block 35, which extends the needle 50 into the mold cavity 10. When the needle 50 is extended into the mold cavity 10 as shown in FIG. 2, the pneumatic drive stops the supply of compressed air through fitting 62. Compressed air, supplied through fitting 64, enters the mold cavity 10 by way of the needle passage 52.

After a predetermined time, the pneumatic drive stops supplying air through fitting 64. Subsequently, the pneumatic drive supplies compressed air to the fitting 66 to move the piston 60 away from the blow cylinder body block 35 and toward the endcap 36, so that the needle 50 is retracted from the mold cavity 10. Exhaust from the mold cavity 10 enters the conduit 21 and travels through the needle passage 52. In the retracted position, the needle passage 52 connects to a groove 70, which vents the exhaust from the needle block 26. The O-rings 72, 74, and 76 seal off air flow and exhaust as the needle 50 extends into the mold cavity 10 and retracts from the mold cavity 10.

Insulator 85, which is preferably Delrin®, forms a layer along the walls 22 of the conduit 21. Insulator 80, which is preferably air, fills the space between the insulator 85 and the needle 50. Both insulators 80 and 85 prevent the cold temperature of the mold 20 from decreasing the temperature of the air delivered through the needle 50 to the mold cavity 10. In the second embodiment, the blow cylinder body block 35 preferably comprises aluminum. Moreover, insulators 80 and 85 isolate the needle 50, which carries the exhaust from the cold mold 20. This prevents the condensation of the polymer volatiles on the outside of the needle 50 and in the needle passage 52.

Figure 3:
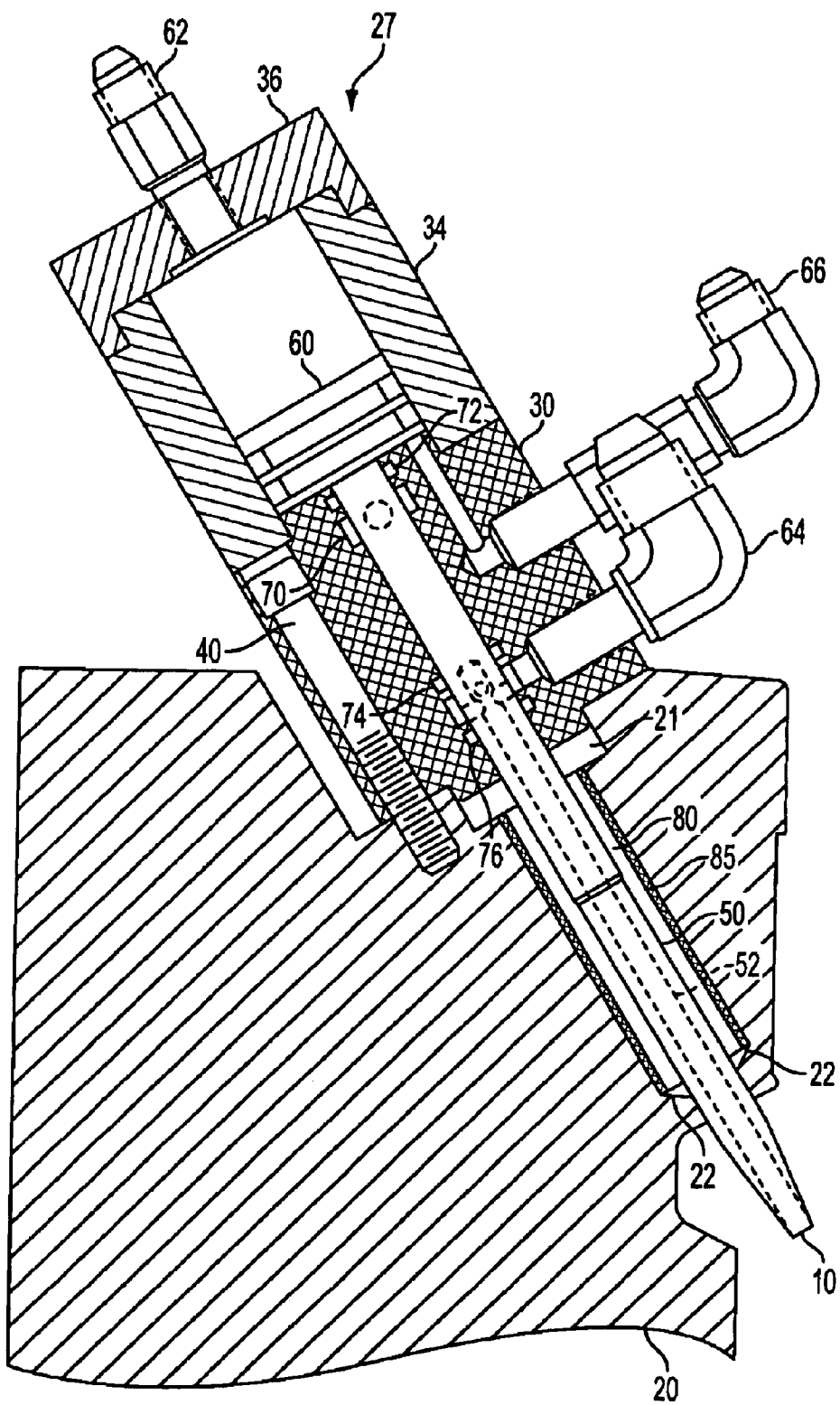
FIG. 3 is a cross section of an air injection and exhaust removal system of a third embodiment of the present invention.

FIG. 3 shows a third preferred embodiment of an air injection and removal system for injecting and removing air from a mold cavity 10. A portion of the mold is identified by reference number 20. The mold 20 has a conduit 21, which extends from the mold cavity 10 to the air outside the mold cavity 10. The conduit has walls 22.

A needle block 27 is mounted to the mold 10 using screws 40. (For simplicity, only one screw is shown). The needle block 27 includes a blow cylinder body block 30, a cylinder block 34, and a endcap 36. Preferably, the cylinder block 34 and the endcap 36 are aluminum. The screws 40 pass through the blow cylinder body block 30 and into the mold 20 in order secure the blow cylinder body block 30 to the mold 20. Preferably, there is no air gap between the blow cylinder body block 30 and the mold 20. A needle 50, connected to a piston 60, passes through the blow cylinder body block 30 and has a passage 52 shown by dotted lines in FIG. 3. A pneumatic drive can supply air to the fittings, 62, 64, and 66. The pneumatic drive is compressed air, which is directed to flow through the fittings 62, 64, and 66 preferably on a mechanical command to a valve, timed by the rotation of the blowmolding wheel (not shown). Compressed air supplied through fitting 62 pushes the piston 60 to the blow cylinder body block 30, which extends the needle 50 into the mold cavity 10. When the needle 50 is extended into the mold cavity 10 as shown in FIG. 3, the pneumatic drive stops the supply of compressed air through fitting 62. Compressed air, supplied through fitting 64, enters the mold cavity 10 by way of the needle passage 52.

After a predetermined time, the pneumatic drive stops supplying air through fitting 64. Subsequently, the pneumatic drive supplies compressed air to the fitting 66 to move the piston 60 away from the blow cylinder body block 30 and toward the endcap 36, so that the needle 50 is retracted from the mold cavity 10. Exhaust from the mold cavity 10 enters the conduit 21 and travels through the needle passage 52. In the retracted position, the needle passage 52 connects to a groove 70, which vents the exhaust from the needle block 27. The O-rings 72, 74, and 76 seal off air flow and exhaust as the needle 50 extends into the mold cavity 10 and retracts from the mold cavity 10.

Insulator 85, which is preferably Delrin®, forms a layer along the walls 22 of the conduit 21. Insulator 80, which is preferably air, fills the space between the insulator 85 and the needle 50. Both insulators 80 and 85 prevent the cold temperature of the mold 20 from decreasing the temperature of the air delivered through the needle 50 to the mold cavity 10. In the third embodiment, the blow cylinder body block 30 preferably comprises an insulator, e.g. Delrin®. Moreover, insulators 80 and 85 isolate the needle 50, which carries the exhaust from the cold mold 20. This prevents the condensation of the polymer volatiles on the outside of the needle 50 and in the needle passage 52.

Figure 4:
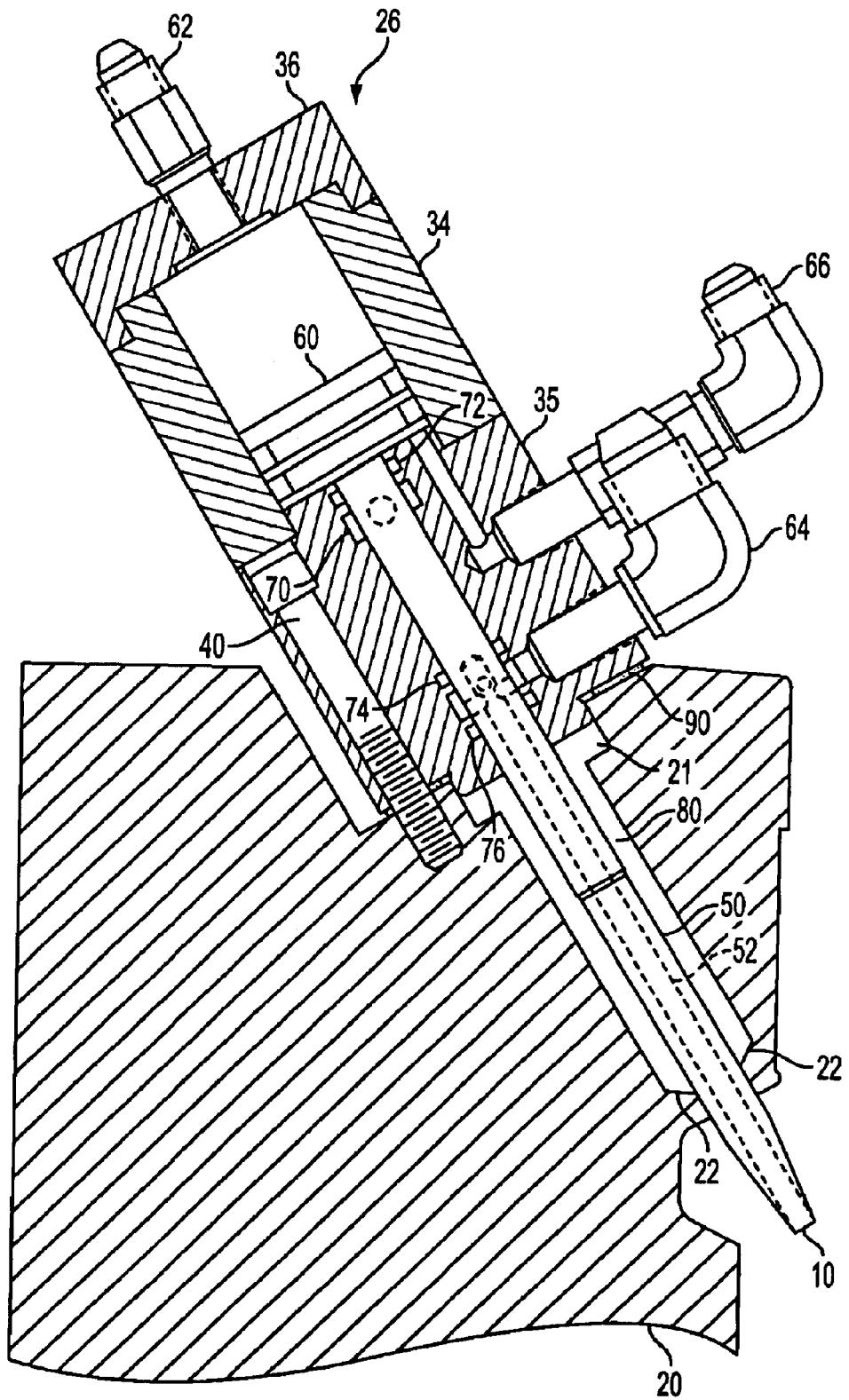
FIG. 4 is a cross section of an air injection and exhaust removal system of a fourth embodiment of the present invention.

FIG. 4 shows a fourth preferred embodiment of an air injection and removal system for injecting and removing air from a mold cavity 10. A portion of the mold is identified by reference number 20. The mold 20 has a conduit 21, which extends from the mold cavity 10 to the air outside the mold cavity 10. The conduit has walls 22.

A needle block 26 is mounted to the mold 10 using screws 40. (For simplicity, only one screw is shown). The needle block 26 includes a blow cylinder body block 35, a cylinder block 34, and a endcap 36. Preferably, the cylinder block 34 and the endcap 36 are aluminum. The screws 40 pass through the blow cylinder body block 35 and into the mold 20 in order secure the blow cylinder body block 35 to the mold 20. Preferably, there is a small contact mounting pad or spacer 90 between the blow cylinder body block 35 and the mold 20. The spacer 90 permits an air gap to be formed between part of the blow cylinder body block 35 and mold 20 to further isolate the air or exhaust moving through the needle 50. The air gap is relatively small. The air gap is approximately 0.03 inches. Although the air gap could be slightly less than 0.03 inches, the air gap is preferably at least 0.03 inches.

A needle 50, connected to a piston 60, passes through the cylinder body block 35 and has a passage 52 shown by dotted lines in FIG. 4. A pneumatic drive can supply air to the fittings, 62, 64, and 66. The pneumatic drive is compressed air, which is directed to flow through the fittings 62, 64, and 66 preferably on a mechanical command to a valve, timed by the rotation of the blowmolding wheel (not shown). Compressed air supplied through fitting 62 pushes the piston 60 to the blow cylinder body block 35, which extends the needle into the mold cavity 10. When the needle is extended into the mold cavity 10 as shown in FIG. 4, the pneumatic drive stops the supply of compressed air through fitting 62. Compressed air, supplied through fitting 64, enters the mold cavity 10 by way of the needle passage 52.

After a predetermined time, the pneumatic drive stops supplying air through fitting 64. Subsequently, the pneumatic drive supplies compressed air to the fitting 66 to move the piston 60 away from the blow cylinder body block 35 and toward the endcap 36, so that the needle 50 is retracted from the mold cavity 10. Exhaust from the mold cavity 10 enters the conduit 21 and travels through the needle passage 52. In the retracted position, the needle passage 52 connects to a groove 70, which vents the exhaust from the needle block 26. The O-rings 72, 74, and 76 seal off air flow and exhaust as the needle 50 extends into the mold cavity 10 and retracts from the mold cavity 10.

An insulator 80, which is preferably air, fills the space between the walls 22 of the conduit and the needle 50, to prevent the cold temperature of the mold 20 from decreasing the temperature of the air delivered through the needle 50 to the mold cavity 10. In the third embodiment, the blow cylinder body block 35 preferably comprises aluminum. Moreover, insulator 80 isolate the needle 50, which carries the exhaust from the cold mold 20. This prevents the condensation of the polymer volatiles on the outside of the needle 50 and the needle passage 52.

Any of these embodiments or variations thereof may be utilized to enhance a conventional extrusion blow molding process. The conventional blow molding process begins with forming a parison on a flow head to form a hollow tube (not shown). The tube is placed between the mold halves and the mold is closed. Compressed air is supplied through fitting 62 to the piston 60. The piston 60 pushes the needle 50 into the parison and air pressure blows through the needle 50 into the parison to blow the parison to form the container. Subsequently, the supply of air through the needle 50 is terminated. The needle 50 retracts and allows the exhaust to pass through the passage 52. The exhaust is then vented from groove 70.

Therefore, any of these embodiments or variations thereof may be utilized in an extrusion blow molding process to isolate the mold cooling temperature from the air injection and exhaust system. These embodiments provide the additional advantages of very substantially reducing the amount of polymer volatiles that condense from the exhaust onto the needle 50, the cavity surrounding the needle 50, and the needle passage 52 in blow molding apparatus. These advantages provide a more efficient air injection and exhaust removal system and extends the time between servicing and cleaning of the mold 20.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What is claimed is:

1. An apparatus, mounted to a mold, for injecting air into a mold cavity and removing exhaust from the mold cavity, comprising:

a blow cylinder body block mounted to the mold having a conduit to the mold cavity, wherein the blow cavity body block comprises a first insulator and the conduit has walls;

a needle passing through the blow cylinder body block and the conduit, wherein the needle is connected to a piston, wherein the needle has a needle passage, and wherein compressed air is applied to the piston to extend the needle into the mold cavity and retract the needle from the mold cavity; and a second insulator between the needle and the conduit walls.

2. The apparatus of claim 1, wherein the first insulator comprises and acetal resin.

3. The apparatus of claim 1, wherein the second insulator is air.

4. The apparatus of claim 1, further comprising a plurality of O-rings surrounding the needle to seal off air flow and exhaust.

5. The apparatus of claim 1, further comprising a groove surrounding the needle in the blow cylinder body block.

6. The apparatus of claim 1, further comprising a cylinder block; and a endcap, wherein the endcap, cylinder block and blow cylinder body block form a housing in which the piston is housed.

7. The apparatus of claim 6, wherein the cylinder block and end cap comprise aluminum.

8. The apparatus of claim 6, further comprising:

a first fitting connected to the housing through the endcap;

a second fitting connected to the housing through the blow cylinder body block; and a third fitting passing through the blow cylinder body block and connected by an air passage to the needle.

9. The apparatus of claim 8, wherein said first, second, and third fittings are coupled to a pneumatic drive for supplying compressed air to the first, second, and third fittings.

10. An apparatus, mounted to a mold, for injecting air into a mold cavity and removing exhaust from the mold cavity, comprising:

a blow cylinder body block mounted to the mold having a conduit to the mold cavity, wherein the conduit has walls;

a needle passing through the blow cylinder body block and the conduit, wherein the needle is connected to a piston, wherein the needle has a needle passage, and wherein compressed air is applied to the piston to extend the needle into the mold cavity and retract the needle from the mold cavity; and a first insulator forming a layer on the conduit walls.

11. The apparatus of claim 10, wherein the first insulator comprises an acetal resin.

12. The apparatus of claim 10, further comprising a second insulator between the first insulator and the conduit walls, wherein the second insulator is air.

13. The apparatus of claim 10, further comprising a plurality of O-rings surrounding the needle to seal off air flow and exhaust.

14. The apparatus of claim 10, wherein the blow cylinder body block comprises aluminum.

15. The apparatus of claim 10, wherein the blow cylinder body block is an insulator.

16. The apparatus of claim 10, wherein the blow cylinder body block comprises an acetal resin.

17. The apparatus of claim 10, further comprising a groove surrounding the needle in the blow cylinder body block.

18. The apparatus of claim 10, further comprising a cylinder block; and a endcap, wherein the endcap, cylinder block and blow cylinder body block form a housing in which the piston is housed.

19. The apparatus of claim 18, further comprising:

a first fitting connected to the housing through the endcap;

a second fitting connected to the housing through the blow cylinder body block; and a third fitting passing through the blow cylinder body block and connected by an air passage to the needle.

20. The apparatus of claim 19, wherein said first, second, and third fittings are coupled to a pneumatic drive for supplying compressed air to the first, second, and third fittings.

21. The apparatus of claim 18, wherein the blow cylinder body block, cylinder block and endcap comprise aluminum.

22. An apparatus, mounted to a mold having a mounting surface, for injecting air into a mold cavity and removing exhaust from the mold cavity, comprising:

a spacer;

a blow cylinder body block mounted to the mold through a spacer forming an air gap between the mounting surface and the blow cylinder body block, wherein the mold has a conduit to the mold cavity and wherein the conduit has walls;

a needle passing through the body and the conduit, wherein the needle has a needle passage, and wherein compressed air is applied to the piston to extend the needle into the mold cavity and retract the needle from the mold cavity; and an insulator between the needle and the conduit walls.

23. The apparatus as in claim 22, wherein the insulator is air.

24. The apparatus of claim 22, further comprising a plurality of O-rings surrounding the needle to seal off air flow and exhaust.

25. The apparatus of claim 22, further comprising a groove surrounding the needle in the blow cylinder body block.

26. The apparatus of claim 22, further comprising a cylinder block; and a endcap, wherein the endcap, cylinder block and blow cylinder body block form a housing in which the piston is housed.

27. The apparatus of claim 26, further comprising:

a first fitting connected to the housing through the endcap;

a second fitting connected to the housing through the blow cylinder body block; and a third fitting passing through the blow cylinder body block and connected by an air passage to the needle.

28. The apparatus of claim 27, wherein said first, second, and third fillings are coupled to a pneumatic drive for supplying compressed air to the first, second, and third fittings.

29. The apparatus of claim 26, wherein the blow cylinder body block, cylinder block, and end cap comprise aluminum.

30. The apparatus of claim 22, wherein the air gap is at least 0.03 inches.

* * * * *

UNITED STATES PATENT AND TRADEMARK OFFICE
CERTIFICATE OF CORRECTION

PATENT NO. : 6,739,858 B2  Page 1 of 1
DATED : May 25, 2004
INVENTOR(S) : Roy Krohn et al.

It is certified that error appears in the above-identified patent and that said Letters Patent is hereby corrected as shown below:

Column 7,
Line 2, please change "and" to -- an --

Signed and Sealed this

Twenty-first Day of December, 2004

JON W. DUDAS
*Director of the United States Patent and Trademark Office*